Patented Dec. 19, 1933

1,939,860

UNITED STATES PATENT OFFICE 1,939,860

FILTERING MATERIAL AND METHOD OF PREPARING THE SAME

Henry S. Montgomery, South Pasadena, Calif., assignor of one-half to H. A. Brassert & Company, Chicago, Ill., a corporation of Illinois No Drawing. Application August 22, 1929
Serial No. 387,782

7 Claims. (Cl. 252—2)

This invention relates to a new and improved filtering material and to a method of preparing the same.

In filtering liquids, such, for example, as hydrocarbons, to remove impurities or free carbon, or in the purification of liquors from various processes, it has been customary to use various forms of earth as a filtering material. The earthy materials used have consisted of diatomaceous earth, fuller's earth, and other materials of the same general characteristics.

In experiments with various types of earth I have found that the size and shape of the particles going to make up the body of the filtering material have an important effect on the efficiency of the filtering operation. For example, I have found that various types of diatomaceous earth have differing contents as to various forms of diatoms. I have found that earth in which the diatom known as the "spicule" predominates gives better filtering conditions and results than those earths in which the spicule constitutes a smaller portion.

This spicule diatom is of the long, slender, fibrous, hairlike species and assists in forming a more porous filtering mat or cake with a larger percentage of voids. The filtering efficiency of an earth, therefore, can be increased by adding to it elements shaped like the spicule diatom, or such diatom itself if it is available. These additions may be made not only to diatomaceous earth, but to other earths, such as fuller's earth, and decolorizing clays used for filtering purposes.

I have also found that the pre-treatment of diatomaceous earth is highly important in connection with its filtering efficiency. This filtering efficiency depends chiefly upon its physical characteristics, its chemical constituents, the types of diatoms present and their relative quantities, and the method of preparing or treating the crude earth. The method of treatment of the crude earth at present in use, comprises the pulverization of the earth in a dry state by means of high-speed impact pulverizers, the fine powder being graded and recovered by air flotation. When the deposits of diatomaceous earth are formed there is more or less fine silt and clayey material deposited with the diatom skeletons, which materials tend to bind the skeletons together and which also tend to cause a greater fracture of the diatoms when the earth is broken up in the dry state. This clayey material is also detrimental to the use of the diatomaceous earth for filtration purposes, as it tends to form a sticky, impervious cake. Calcination and elutriation after the earth has been powdered help to remedy this trouble to some degree, calcination by fixing the clay by burning it, and elutriation by washing it out. When the earth is broken up in the dry state, however, a great many diatoms will be partly or entirely covered with the clayey material and when this is calcined the filtering effect of these diatoms is wholly or partly lost.

It is an object of the present invention to provide a new and improved filtering material, together with a method of making and using the same.

It is a further object to provide a method whereby the usual types of filtering material may be treated to increase their filtering efficiency.

It is also an object to provide a means and method whereby material may be added to usual filtering materials to increase their filtering efficiency.

It is an additional object to provide a method of utilizing the filtering materials so provided or treated.

It is also an object to provide a method whereby the fibrous content of non-filtering materials may be increased.

Other and further objects will appear as the description proceeds.

Diatomaceous earth, also known as kieselguhr, and fuller's earth, together with other similar earthy materials such as infusorial earth and decolorizing earth, such as magnesium and aluminum silicates have been widely used for filtering purposes. The powdered earthy material has been added in small amounts to the liquid material to be filtered, thoroughly mixed with the material by agitation, and pumped into filter presses where the earthy material is deposited with the natural gums, colloids, and similar impurities on filter leaves. I have found that in order to more efficiently keep the filter cake in a porous condition and to allow the liquid to filter through with greater ease and to give a clearer and more brilliant filtrate, it is highly desirable to have a considerable portion of fibrous matter in combination with the earthy matter.

Where diatomaceous earth is used, it is desirable to have a large proportion of the "spicule" diatoms and this proportion may be increased by adding such diatoms, if available. I have found also that the efficiency of this earth is decreased by the usual methods of dry pulverization which serve to break up the diatom skeletons and the "spicule" diatoms, so that the earth is more finely divided and packs into a dense filter cake with a reduced amount of voids. In order to prevent this disruption of the skeletons I disintegrate the crude diatomaceous earth under water, preferably after it has been allowed to soak or digest in water for several hours. I find that if this material is first softened by soaking it in water and then the earth is disintegrated under water, there is a better separation obtained of the clayey material from the diatoms, and the diatoms will be left in a less broken up state. This method of treatment is more efficient in removing the clayey and sandy material which tends to form a sticky, impervious cake. The earth may be disintegrated under water by crushing or agitating it, and after the clayey and sandy material has been removed by decantation, the earth may be recovered by settling or by filter pressing and the dried sludge or filter cake reduced to a powder by some suitable means, such as putting through an impact type mill.

In order to increase the percentage of voids in the material, whether diatomaceous earth, fuller's earth, or other similar earthy materials, I have found that other fibrous materials may be used, such, for example, as mineral wool or slag wool. This mineral wool is first cleaned of any foreign matter and heavy particles or nodules, by some suitable treatment such as putting through an impact type mill in dry state and screening or air floating, or screening and washing in water, allowing the heavy material to settle and the lighter material to flow off. This lighter material is then recovered for use. The washing will also remove any soluble salts present in the mineral wool, which salts might be detrimental to the filtering operation or undesirable as constituents of the filtrate. Some slag wools, for example, contain sufficient amounts of calcium sulphide, unless they have been especially desulphized, to form appreciable amounts of sulphuric acid by the action of water. By washing the wool before adding it to the diatomaceous earth or other earthy material, trouble from this source is averted. It will also sometimes be found desirable to reduce the wool to a finer state by grinding it before adding it to the earthy material.

The prepared mineral wool can be added to the crude earth and put through the milling operation with it, or the wool may be added to the powdered earth in any suitable manner so that it is thoroughly mixed throughout the mass. As a further manner of use the mineral wool may be added with the powdered earth to the liquid to be filtered and well agitated in the liquid before being pumped into the filter presses or other filtering apparatus.

In addition to mineral wool or slag wool, other materials may be used, such, for example, as asbestos or other natural mineral wool, spun glass or wood fibres, animal wool or hair, or any material having similar characteristics. The proportions of earthy material and of the finely divided fibrous material will depend upon the character of the liquid being treated and the character of the entrained matter to be removed by the filter. Where an earthy matter used for filtering purposes consists of a diatomaceous earth having a high percentage of the "spicule" diatom, it may be necessary to add little, if any, fibrous material, especially where the diatomaceous earth is broken up under water, according to my method. On the other hand, with earthy material, such as fuller's earth, it may be desirable to add increased quantities of fibrous material.

While I have described certain preferred methods and means for carrying out my invention, they are capable of changes and variations to meet differing requirements and conditions, and I contemplate such changes and modifications as come within the spirit and scope of the appended claims.

I claim:

1. The method of preparing a filtering material which comprises screening and washing mineral wool in water, allowing the heavy material to settle, recovering the lighter material, cleaning diatomaceous earth of colloidal, clayey and sandy matter and mixing the lighter mineral wool and diatomaceous earth.

2. The method of preparing a filtering material which comprises screening and washing mineral wool in water, allowing the heavy material to settle, recovering the lighter material, grinding said material to reduce it to a finer state, cleaning diatomaceous earth of colloidal, clayey and sandy matter and mixing the lighter mineral wool and diatomaceous earth.

3. The method of preparing a filtering material which comprises soaking crude diatomaceous earth in water, disintegrating the earth under water, washing out clayey, colloidal and sandy matter, recovering the purified diatomaceous earth, and adding finely divided fibrous material to the diatomaceous earth.

4. The method of preparing a filtering material which comprises soaking diatomaceous earth in water, disintegrating the earth under water, removing impurities by decantation, calcining the earth, screening and washing mineral wool in water, allowing the heavy material to settle, recovering the lighter material and mixing it with the treated diatomaceous earth.

5. The method of preparing a filtering material which comprises screening and washing mineral wool in water, allowing the heavy material to settle, recovering the lighter material, cleaning diatomaceous earth of colloidal, clayey and sandy matter, calcining said diatomaceous earth, and mixing the lighter mineral wool and diatomaceous earth.

6. The method of preparing a filtering material which comprises screening and washing mineral wool in water, allowing the heavy material to settle, recovering the lighter material, grinding said material to reduce it to a finer state, cleaning diatomaceous earth of colloidal, clayey and sandy matter, calcining said diatomaceous earth, and mixing the lighter mineral wool and diatomaceous earth.

7. The method of preparing a filtering material which comprises soaking crude diatomaceous earth in water, disintegrating the earth under water, washing out clayey, colloidal and sandy matter, recovering the purified diatomaceous earth, calcining said diatomaceous earth, and adding finely divided fibrous material to the diatomaceous earth.

HENRY S. MONTGOMERY.